(12) United States Patent
Geurts et al.

(10) Patent No.: US 8,517,836 B2
(45) Date of Patent: Aug. 27, 2013

(54) SOUND STEPS

(75) Inventors: Lucas Jacobus Franciscus Geurts, Best (NL); Vincentius Paulus Buil, Eindhoven (NL); Rik Remco Wesselink, Eindhoven (NL); Bas Groenendaal, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 30 days.

(21) Appl. No.: 13/139,758

(22) PCT Filed: Dec. 14, 2009

(86) PCT No.: PCT/IB2009/055730
§ 371 (c)(1),
(2), (4) Date: Sep. 19, 2011

(87) PCT Pub. No.: WO2010/070570
PCT Pub. Date: Jun. 24, 2010

(65) Prior Publication Data
US 2012/0034979 A1 Feb. 9, 2012

(30) Foreign Application Priority Data
Dec. 16, 2008 (EP) .................................. 08171749

(51) Int. Cl.
*A63F 13/00* (2006.01)
*A63F 13/02* (2006.01)
*A63F 13/12* (2006.01)

(52) U.S. Cl.
USPC ................. 463/36; 463/38; 463/46

(58) Field of Classification Search
USPC ........................................... 463/36
See application file for complete search history.

(56) References Cited

U.S. PATENT DOCUMENTS

| | | | |
|---|---|---|---|
| 3,922,944 A | 12/1975 | Kurosaki et al. | |
| 5,584,779 A * | 12/1996 | Knecht et al. | 482/8 |
| 5,672,131 A * | 9/1997 | Osborne et al. | 473/527 |
| 5,816,580 A * | 10/1998 | Osborne et al. | 273/454 |
| 6,012,995 A * | 1/2000 | Martin | 473/459 |
| 6,329,620 B1 * | 12/2001 | Oishi et al. | 200/86.5 |
| 6,450,886 B1 * | 9/2002 | Oishi et al. | 463/36 |
| 6,685,480 B2 * | 2/2004 | Nishimoto et al. | 434/247 |
| 6,758,753 B1 * | 7/2004 | Nagata et al. | 463/36 |
| 6,905,413 B1 * | 6/2005 | Terao et al. | 463/40 |

(Continued)

FOREIGN PATENT DOCUMENTS

| | | | |
|---|---|---|---|
| EP | 1908502 A1 * | 4/2008 | |
| WO | 2007105246 A2 | 9/2007 | |
| WO | 2008041175 A2 | 4/2008 | |

*Primary Examiner* — Arthur O. Hall
*Assistant Examiner* — Bach Hoang

(57) ABSTRACT

According to one aspect, the invention provides an interactive gaming system comprising at least one tile, each tile comprising a pressure sensor, a controller being for generating a control signal associated with the pressure exerted on the tile and tile communicator for wirelessly sending the control signal to a control unit. The system further comprises a control unit comprising control unit communicator arranged for wirelessly receiving the control signal from a tile, a game controller comprising a game memory and an interpreter for interpreting the control signal in the light of a stored game and a signal generator for generating signals associated with the interpreted control signal. A tile further comprises an orientation sensor for identifying on which side of the tile the pressure is exerted. In one aspect the present invention provides a more versatile gaming system.

12 Claims, 5 Drawing Sheets

(56) References Cited

U.S. PATENT DOCUMENTS

| | | | |
|---|---|---|---|
| 7,118,482 B2 * | 10/2006 | Ishihara et al. | 463/43 |
| 7,122,751 B1 * | 10/2006 | Anderson et al. | 200/85 R |
| 7,355,134 B1 * | 4/2008 | Anderson | 200/85 R |
| 7,361,856 B1 * | 4/2008 | Anderson | 200/85 R |
| 7,547,854 B1 * | 6/2009 | Anderson | 200/85 R |
| 7,854,686 B2 * | 12/2010 | Mar et al. | 482/8 |
| 7,888,612 B1 * | 2/2011 | Anderson | 200/85 R |
| 8,079,251 B2 * | 12/2011 | Miyanaga | 73/65.01 |
| 8,100,770 B2 * | 1/2012 | Yamazaki et al. | 463/39 |
| 8,152,640 B2 * | 4/2012 | Shirakawa et al. | 463/36 |
| 8,215,642 B2 * | 7/2012 | Macura et al. | 273/309 |
| 2002/0055383 A1 * | 5/2002 | Onda et al. | 463/36 |
| 2003/0218537 A1 | 11/2003 | Hoch et al. | |
| 2004/0127285 A1 * | 7/2004 | Kavana | 463/36 |
| 2005/0200455 A1 * | 9/2005 | Veni et al. | 340/7.55 |
| 2006/0211495 A1 * | 9/2006 | Lin | 463/36 |
| 2008/0004113 A1 * | 1/2008 | Avery et al. | 463/37 |
| 2008/0139307 A1 * | 6/2008 | Ueshima et al. | 463/31 |
| 2008/0261696 A1 * | 10/2008 | Yamazaki et al. | 463/39 |
| 2008/0280682 A1 | 11/2008 | Brunner et al. | |
| 2009/0093305 A1 * | 4/2009 | Okamoto et al. | 463/36 |
| 2009/0093315 A1 * | 4/2009 | Matsunaga et al. | 463/43 |
| 2009/0094442 A1 * | 4/2009 | Okamoto et al. | 712/225 |
| 2009/0258700 A1 * | 10/2009 | Bright et al. | 463/31 |
| 2009/0258704 A1 * | 10/2009 | Asami | 463/36 |
| 2011/0190059 A1 * | 8/2011 | Otani | 463/36 |
| 2011/0281650 A1 * | 11/2011 | Yamazaki et al. | 463/36 |

* cited by examiner

SOUND STEPS

FIELD OF THE INVENTION

The invention relates to the field of interactive gaming systems, and in particular gaming systems wherein pressure sensitive surfaces are used to detect the movement of a user.

Early examples of such systems are the various dance mats. These dance mats have a fixed configuration of interaction points to be played on. It is a drawback of these dance mats that they are only suitable for specific games.

BACKGROUND OF THE INVENTION

To create a more flexible gaming environment, the next generation interactive gaming systems, like Royal Philips Electronics' patent application WO 2008/041175 A2's 'interactive modular tile system' comprises a plurality of modular interactive tiles, with which various playgrounds may be configured. Interacting with the tiles requires physical activity like stepping on the tiles or jumping from tile to tile.

However, a problem of this generation of gaming systems is the limited configuration flexibility.

SUMMARY OF THE INVENTION

It is an object of the invention to solve this problem and provide a more versatile gaming system.

According to one aspect, the invention provides an interactive gaming system as defined in claim 1.

Using two-sided tiles in a gaming system provides more configuration flexibility and a more versatile gaming system.

The game memory may be configured for storing a plurality of games and the game controller may comprises a game selector for selecting a game to play, the game selector being controllable by positioning selection cards comprising a game identifier near the game selector.

This is a very intuitive way of selecting games.

Further, at least one side of a selection card may comprise a graphical representation of the game and the control unit may comprise a holder for holding the selection card, such that the graphical representation of the game is visible during the game.

An advantage of using the game selection cards to graphically express the game is that this user interface is especially suitable for young children.

According to another aspect, the invention provides a tile for use in an interactive gaming system. The tile comprises a tile power supply, a pressure sensor being arranged for measuring a pressure exerted on the tile, a controller being arranged for generating a control signal, the control signal being associated with the pressure exerted on the tile, and a tile communicator being arranged for wirelessly sending the control signal to a control unit. The tile further comprises an orientation sensor for identifying on which side of the tile the pressure is exerted and wherein the controller of the tile is further arranged for generating a control signal being associated with the orientation information of the tile.

Using two-sided tiles in a gaming system provides more configuration flexibility and a more versatile gaming system.

It is to be noted that US patent application US 2008/0280682 A1 discloses a game system comprising a set of independent units which can stand on their own, has a touch sensitive display capable of handling multiple touch points, and has an accelerometer for detecting physical changes in orientation. One of the tiles of the game system will act as a master tile conducting play. US 2008/0280682 A1 discloses the tiles to have a display on one side only.

DESCRIPTION OF THE EMBODIMENTS

Figure 1:
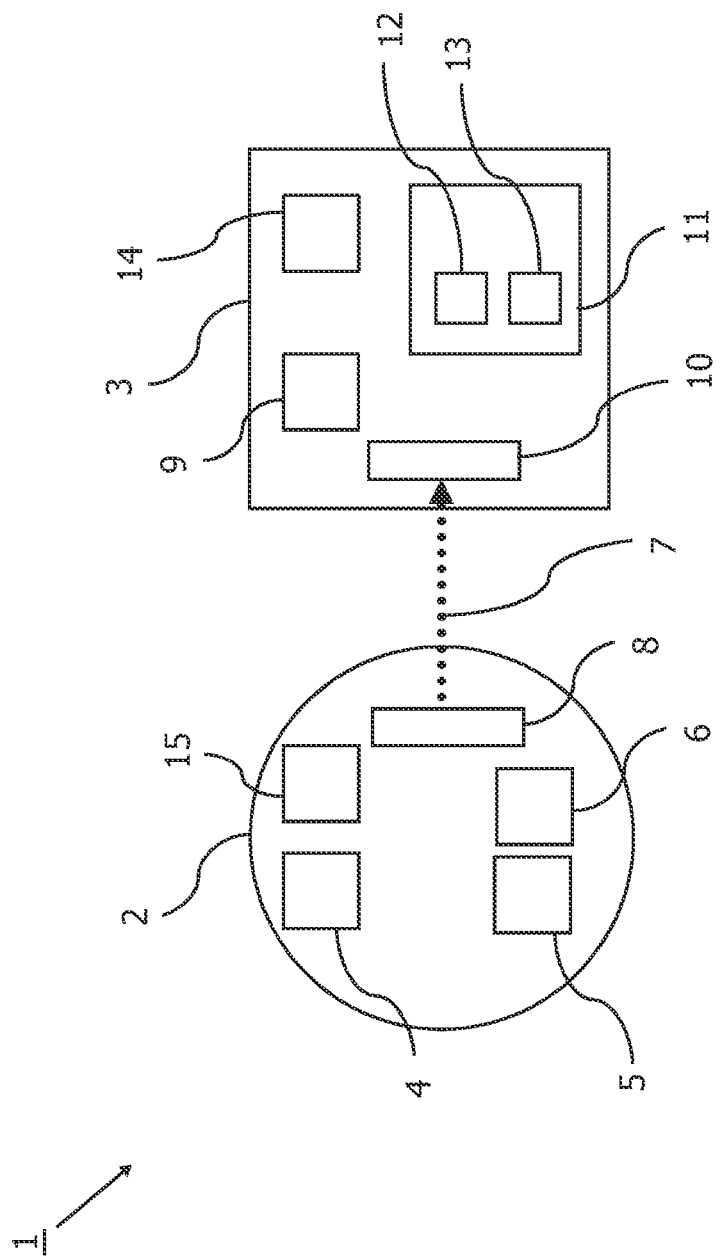
FIG. 1: Schematic representation of a first embodiment of the interactive gaming system according to the present invention.

FIG. 1 shows a schematic representation of a first embodiment of the interactive gaming system (1) according to the present invention. The interactive gaming system (1) comprises at least one tile (2) and a control unit (3).

The term 'gaming' is meant to be construed in a broad sense. A game does e.g. not necessarily require a competitive element. An example of a non competitive game is 'Drums'. Another example of a non competitive game is 'Uno, dos, tres'. An example of a competitive game is 'Musical chairs'. These games will be referred to throughout this description; therefore the games will be shortly explained hereafter.

Drums

In 'Drums', every tile is associated with a drum. The control unit (3) will generate the sound of a drum when a player hits a tile or steps on it. A player may thus create his own drum set with a number of tiles. Alternatively, a plurality of players, each having a tile may play music together, wherein each player controls his own drum.

It is noted that 'Drums' represents a plurality of games with various sounds, e.g. animal sounds like a roaring tiger or a crowing rooster.

Uno, Dos, Tres

'Uno, dos, tres' is an active language learning game. When a player jumps on a tile he hears a Spanish word or sentence. When the player turns the tile upside down and jumps on the tile again, he hears the Dutch translation of the word or sentence.

Musical Chairs

While playing 'Musical chairs' a number of tiles are positioned in a circle. The control unit (3) starts a piece of music and the players start walking around the tiles. When the music stops, the players step on a tile as soon as possible. The control unit (3) indicates which player was the last to step on a tile and looses the game.

In the embodiment shown in FIG. 1, the gaming system, for drawing efficiency, comprises one tile (2). Of course, in practice, the gaming system comprises a plurality of tiles (2). Tiles (2) serve as interaction points for detecting the movement of a user. The tiles (2) may have various shapes, e.g. circular, quadrilateral or hexagonal. A quadrilateral or hexagonal shape may be preferred when building a contiguous playing field.

In this embodiment, each tile (2) comprises a tile power supply (4). An obvious tile power supply (4) is a battery. However other power sources are possible. E.g. the use of power harvesting is contemplated. Power harvesting means that external energy, e.g. energy from a player jumping on the tile (2) is subsequently used by the tile (2) e.g. for communication purposes.

In this embodiment the tiles (2) need not to be switched on before use. The movement of taking the tile (2), e.g. out of a storage automatically activates the tile (2).

The tile (2) of the embodiment shown in FIG. 1 further comprises a pressure sensor (5) arranged for measuring a pressure exerted on the tile (2). In this embodiment, the pressure sensor (5) is arranged for solely detecting whether a force is exerted on the tile (2) or not. In another embodiment, the pressure sensor (5) is also arranged for detecting various pressure levels. The pressure levels may e.g. be used in 'Drums' to produce a sound with a certain volume.

The tile (2) of this embodiment further comprises a controller (6) arranged for generating a control signal (7), the control signal (7) being associated with the pressure exerted on the tile (2). For sending the control signal (7) to the control unit (3), the tile (2) of the embodiment shown in FIG. 1 further comprises tile communicator (8) arranged for wirelessly sending the control signal (7) to the control unit (3). In this embodiment, the Bluetooth protocol is used for wireless communication. However, other protocols like Wi-Fi or infrared (IR) are also possible. Wireless communication enhances the mobility and configurability of the tiles (2) and thereby stimulates the creativity of the players.

The gaming system according to the present invention (1) as shown in FIG. 1 further comprises a control unit (3). The control unit (3) comprises a control unit power supply (9). The control unit (3) may be powered by mains current, but also by accumulator power. The control unit may comprise an on/off switch. Alternatively, the control unit (3) may be activated as soon as it is connected to the power. If there's no activity for some time, the control unit (3) may be automatically switched into sleeping mode. At the moment a game is selected or a control signal (7) is received from a tile (2), the control unit (3) automatically switches on.

The control unit (3) typically looks like a box, a pillar or a pyramid. The control unit (3) may comprise certain expensive components. In case the gaming system will be used by young children, it is preferred that the control unit is extra protected against possible damage caused by the sometimes rough playing behavior of the children. This may improve the durability of the system.

In this embodiment, the control unit (3) further comprises control unit communicator (10) arranged for wirelessly receiving the control signal (7) from a tile (2). The control signal (7) comprises tile information, like the pressure level exerted on the tile (2). In 'Musical chairs' also the arrival time of the control signal (7) is used to determine which tile (2) was stepped on last.

In the embodiment of FIG. 1, the control unit (3) comprises a game controller (11). The game controller (11) comprises a game memory (12) for storing a game. Different types of memory as known in the art are possible. The gaming system will probably be used by young children. Because the playing behavior of young children may sometimes be rough, a memory without moving parts, like flash memory is preferred. The game controller (11) further comprises an interpreter (13) for interpreting the control signal (7) in the light of the stored game.

In the embodiment of FIG. 1, the control unit (3) further comprises a signal generator (14) for generating signals associated with the interpreted control signal (7). In this embodiment, the signal generator (14) comprises an amplifier and a loudspeaker to generate sounds associated with the interpreted control signal (7). In another embodiment, the signal generator (14) may comprise a multi-stimuli generator for generating various sensory stimuli, like sound, light and vibration.

In 'Drums', the sounds of the drums are generated, in 'Musical chairs' the music is played when the players are walking around the tiles (2) and in 'Uno, dos, tres', the Spanish and Dutch words and sentences pronounced. The drumming may be accompanied by light effects or other sensory stimuli.

Characteristic of the invention is that a tile (2) further comprises an orientation sensor (15) for identifying on which side of the tile (2) the pressure is exerted. The orientation sensor (15) may comprise a tilt sensor. To communicate the orientation information to the control unit (3), the controller (6) of the tile (2) is further arranged for generating a control signal (7) being associated with the orientation information of the tile (2). In the embodiment of FIG. 1, the sides of the tiles (2) are visually distinguishable. One side is e.g. red and the other side green, or one side is numbered and the other side is not.

Using two-sided tiles (2) in a gaming system provides better configuration flexibility and a more versatile gaming environment than using tiles (2) that are only usable on one side. Two-sided tiles provide e.g. a very intuitive way of assigning players to a group. In the systems known in the art, groups may be formed by assigning a number of identifiable tiles (2), e.g. tiles (2) with numbers written on it, to a group. This is laborious and inflexible e.g. when players change group or players are added to a group. When using a two-sided tile (2), one side of the tile (2) may be assigned to one group and the other side of the tile (2) to the other group. This is very efficient and flexible. In such a way, a quiz may be played between the 'reds and the blues'.

For playing sounds, each side of the pad may represent another instrument; instead playing only drums, like in 'Drums', cymbals may be added for more variation. By turning the tile (2) around, a player may switch from drums to cymbals or vice versa or switch from an open high hat to a closed high hat. In 'Uno, dos, tres', one side represents the Spanish language and the other side represents the Dutch language.

Figure 2:
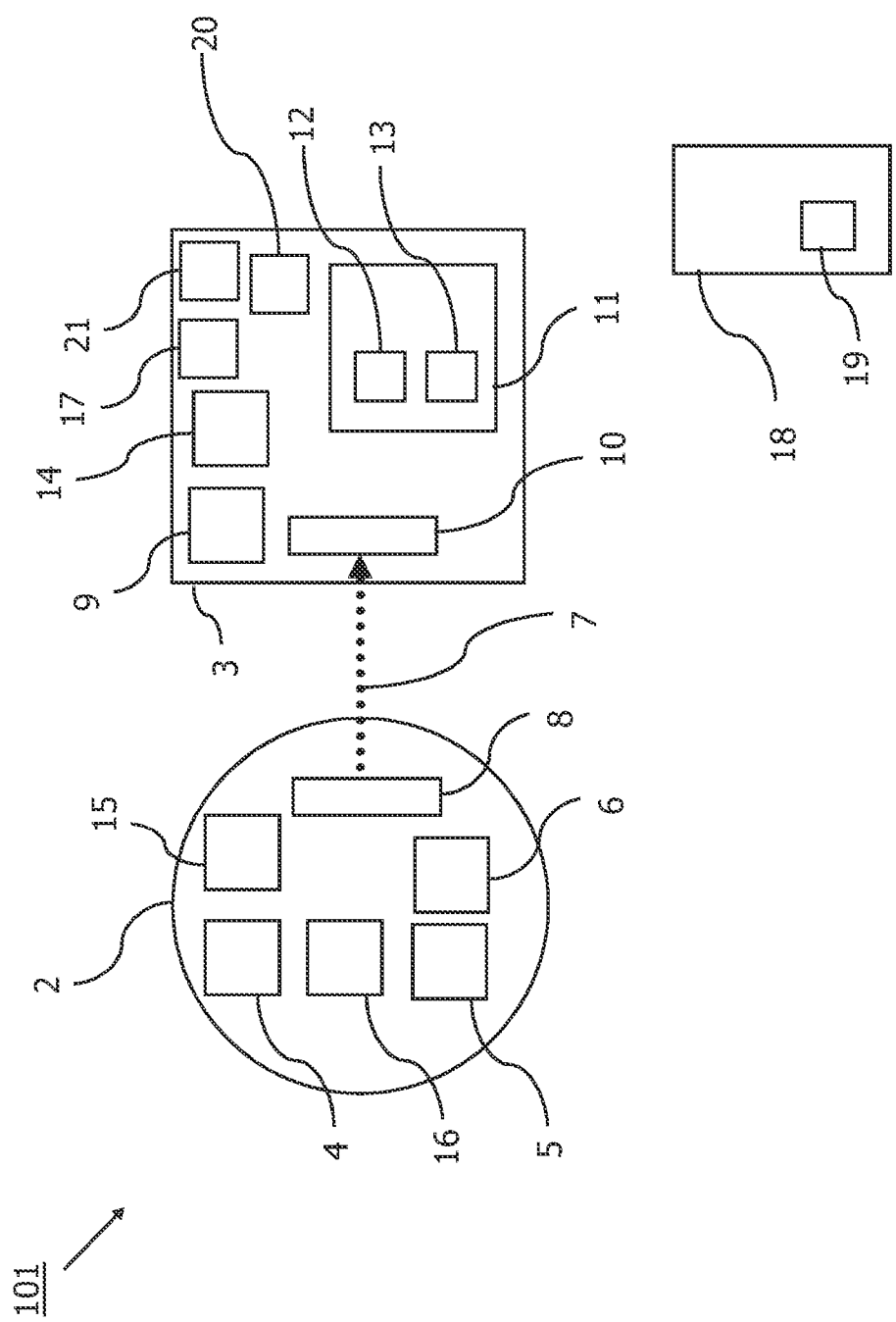
FIG. 2: Schematic representation of a second embodiment of the interactive gaming system according to the present invention.

A second embodiment of the gaming system according to the present invention (101) is shown in FIG. 2. In this embodiment, a tile (2) further comprises a tile identifier (16). This enables the tile (2) to communicate its identity to the control unit communicator. A tile identifier (16) is e.g. needed in 'Musical chairs' to determine which tile (2) was stepped on last. For sending the identity information to the control unit (3), the controller (6) of the tile (2) is further arranged for generating a control signal (7) being associated with the identity information of the tile (2).

In this embodiment, the game memory (12) is configured for storing a plurality of games. New games may be added by connecting the control unit (3) to a pc and transfer the games from the pc to the control unit (3). In this embodiment, the control unit (3) comprises an internet access point for downloading games directly.

For selecting one of these games, the game controller (11) further comprises a game selector (17) for selecting a game to play. Conventional gaming systems e.g. use a display for selection, the display showing a menu with the games available. In the embodiment shown in FIG. 2, the game selector (17) is controllable by positioning a game selection card (18) comprising a game identifier (19) near or against the game selector (17). The game identifier (19) as comprised in the game selection card (18) may comprise a barcode or a passive RFID tag. Alternatively, the card may be a so-called 'active card' comprising a (semi-)active RFID tag.

Figure 3:
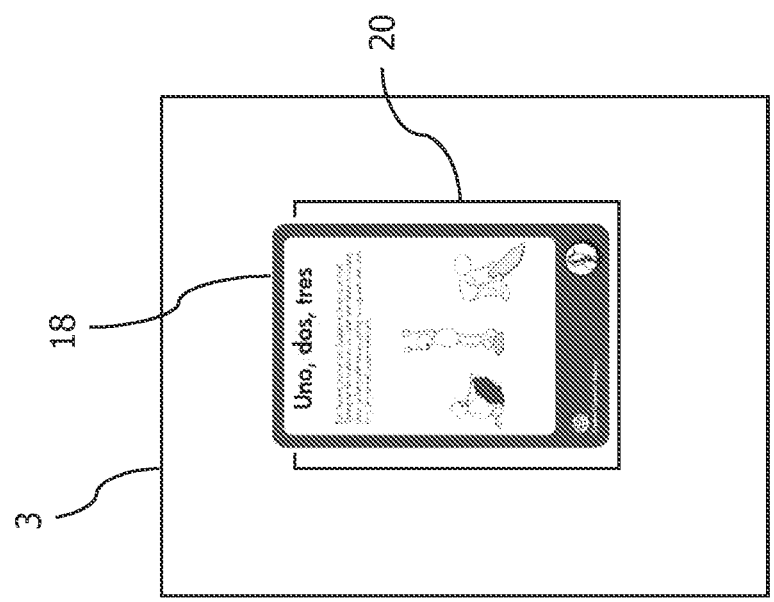
FIG. 3: Front view of a control unit comprising a card holder according to the present invention.
Figure 4:
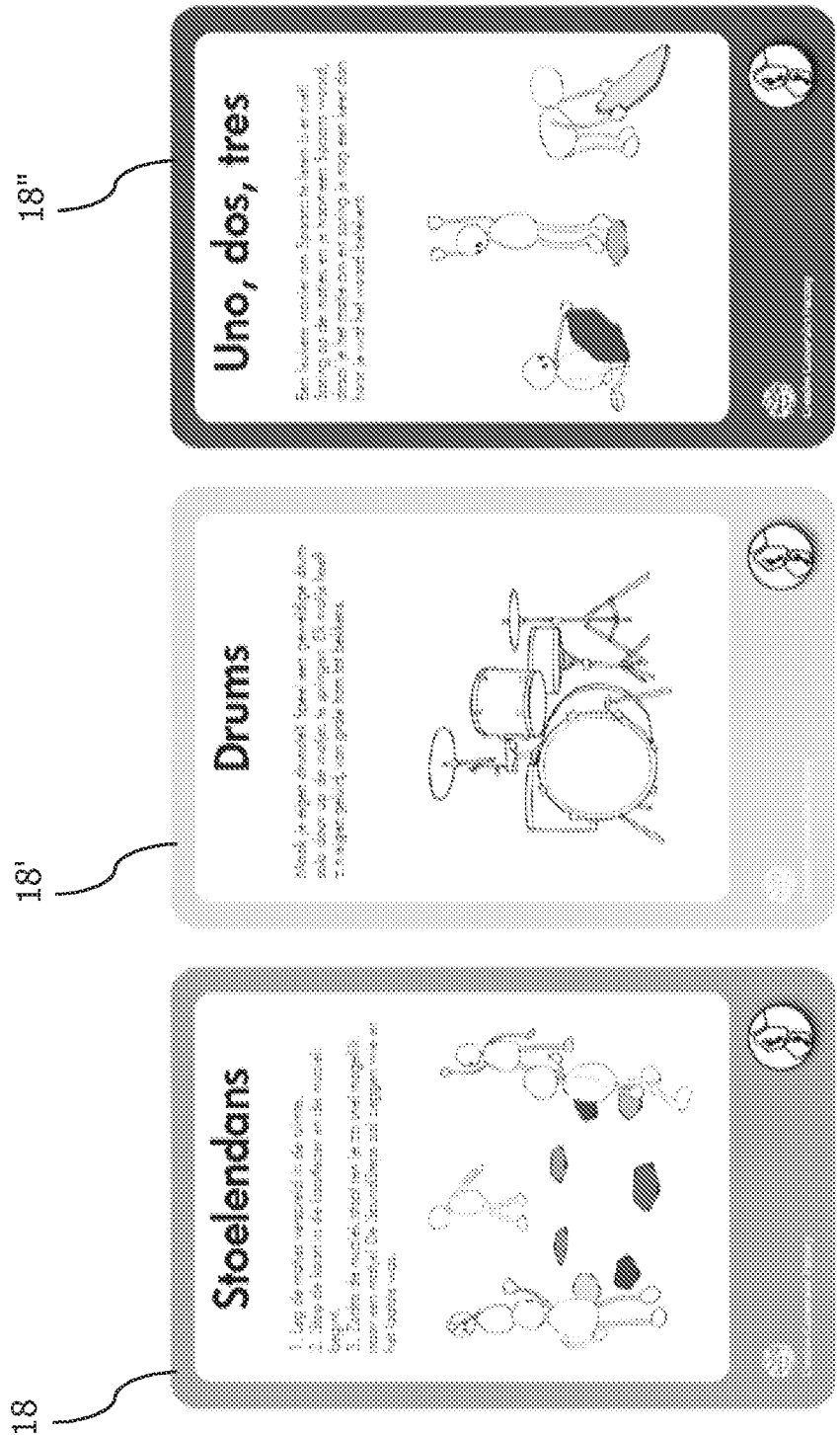
FIG. 4: Examples of game selection cards with graphical representations of games according to the present invention.

In this embodiment, at least one side of the game selection card (18) comprises a graphical representation of the game. FIG. 3 shows a front view of the control unit (3) of this embodiment comprising a card holder (20) near the game selector (17) for holding the game selection card (18), such that the graphical representation of the game is visible on the control unit (3) while the game is being selected. The card holder (20) may be transparent for showing the card or the card holder (20) may be arranged otherwise so as not to hide the card from the view. Examples of graphical representations on selection cards (18, 18' and 18") for the games 'Musical chairs' (Dutch: Stoelendans), 'Drums' and 'Uno, dos, tres' are shown in FIG. 4A, FIG. 4B and FIG. 4C respectively. An advantage of using the game selection cards (18) to graphically express the game is that it makes the system especially suitable for young children. It may further obviate an expensive display.

Figure 5:
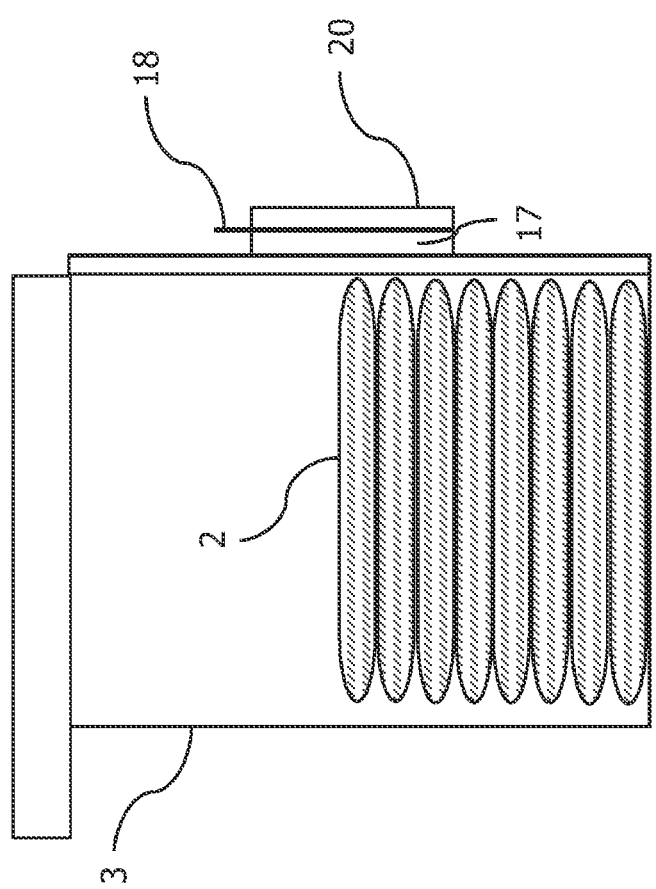
FIG. 5: Side view of a control unit comprising a tile storage and a card holder according to the present invention.

In the embodiment as shown in FIG. 2, the tile power supply (4) comprises a battery and the control unit (3) further comprises a tile storage (21) arranged for storing tiles (2), e.g. in the form of a pile of tiles (2). The tile storage (21) may be further arranged for charging the batteries of the tiles (2). A side view of the control unit in this embodiment is illustrated in FIG. 5. If the tiles (2) are energy efficient, the battery power may be sufficient to last until the batteries are recharged. It might not be necessary to switch the tiles (2) on and off.

In the gaming system according to the present invention, the tile communicator (8) and the control unit communicator (10) are arranged for communicating wirelessly over a distance of 0.1-100 meter, preferably over a distance of 1-50 meter and even more preferably over a distance of 1-10 meter. Depending on the distance, different wireless communication protocols may be used, like infrared (IR) for short distances, Bluetooth for medium distances and Wi-Fi for long distances.

In another embodiment of the gaming system according to the present invention, the control unit communicator (10) is further arranged for sending a control signal (7) to a tile (2) and the tile communicator (8) is further arranged for receiving a control signal (7) from the control unit (3). In this embodiment, two-way communication between the tile (2) and the control unit communicator is possible.

An example of a control signal (7) that may be sent from the control unit (3) to a tile (2) is a deactivation signal. Deactivation of a tile (2) means that the tile (2) is no longer relevant for the present game. In 'Musical chairs' may e.g. the tile (2) that was stepped on last be deactivated by the central control system.

Other signals that may be sent from the control unit (3) to a tile (2) may activate a signal generator comprised in the tile (2). In one embodiment, the tiles (2) comprise a signal generator like a light source (e.g. LED's) or a vibrating unit. This signal generator may be activated by the control unit (3). In 'Musical chairs' the tile (2) that was stepped on last could e.g. start flashing light. The tiles (2) may not need visual identification marks like in case the control unit (3) has to point out the tile (2).

The invention further concerns a tile (2) as defined in claim 10 for use in an interactive gaming system (1).

The detailed drawings, specific examples and particular formulations given serve the purpose of illustration only. The gaming system is controlled by a control unit. The control unit may typically be a central control unit that is shaped as a box, as a pillar or as a pyramid. However, the control unit may also be comprised in a master tile or be distributed over a number of tiles. It is even possible that a control system is comprised in each tile. Furthermore, other substitutions, modifications, changes, and omissions may be made in the design, operating conditions, and arrangement of the exemplary embodiments without departing from the scope of the invention as expressed in the appended claims.

The invention claimed is:

1. An interactive gaming system, comprising:
at least one tile, wherein each tile comprises
a tile power supply,
a pressure sensor being arranged for measuring a pressure exerted on the tile,
a controller being arranged for generating a control signal, the control signal being associated with the pressure exerted on the tile,
a the communicator being arranged for wirelessly sending the control signal to a control unit; and
a control unit, wherein the control unit comprises
a control unit power supply,
a control unit communicator being arranged for wirelessly receiving the control signal from the at least one tile,
a game controller that comprises (i) a game memory for storing at least one game and (ii) an interpreter for interpreting the control signal with respect to a stored game,
a signal generator for generating signals associated with the interpreted control signal;
wherein
each tile further comprises a two-sided tile having an orientation sensor that includes a tilt sensor for providing orientation information to identify on which side of the two-sided tile the pressure is exerted and wherein the controller of the two-sided tile is further arranged for generating a control signal being associated with the orientation information of the two-sided tile and wherein each of the sides of the two-sided tile are arranged for use during play, wherein one side provides a first configuration flexibility and, responsive to turning the two-sided tile upside down, the other side provides a second configuration flexibility different from the first configuration flexibility.

2. The interactive gaming system according to claim 1, wherein each tile further comprises a tile identifier that provides identity information of the respective tile and wherein the controller of the tile is further arranged for generating a control signal being associated with the identity information of the tile.

3. The interactive gaming system according to claim 1, wherein the game memory is configured for storing a plurality of games and wherein the game controller further comprises a game selector for selecting a game to play, said game selector being controllable by positioning selection cards that comprise a game identifier near the game selector.

4. The interactive gaming system according to claim 3, wherein at least one side of a selection card comprises a graphical representation of the game and wherein the control unit comprises a holder for holding the selection card, such that the graphical representation of the game is visible during the game.

5. The interactive gaming system according to claim 1, wherein the tile power supply comprises a battery and wherein the control unit further comprises a tile storage arranged for storing a plurality of tiles, the tile storage being further arranged for charging the batteries of the plurality of tiles.

6. The interactive gaming system according to claim 1, wherein the communicator and the control unit communicator are arranged for communicating wirelessly over a distance of 0.1-100 meter.

7. The interactive gaming system according to claim 1, wherein the control unit communicator is further arranged for sending a control signal to a tile and wherein the communicator is further arranged for receiving a control signal from the control unit.

8. The interactive gaming system according to claim 7, wherein the tile further comprises a signal generator responsive to the control signal sent by the control unit communicator.

9. The interactive gaming system according to claim 1, wherein the pressure sensor is arranged for detecting various pressure levels.

10. A tile for use in an interactive gaming system, the tile comprising:
   a tile power supply,
   a pressure sensor being arranged for measuring a pressure exerted on the tile,
   a controller being arranged for generating a control signal, the control signal being associated with the pressure exerted on the tile, and
   a tile communicator being arranged for wirelessly sending the control signal to a control unit, wherein
   the tile further comprises a two-sided tile having an orientation sensor that includes a tilt sensor for providing orientation information to identify on which side of the two-sided tile the pressure is exerted and wherein the controller of the two-sided tile is further arranged for generating a control signal being associated with the orientation information of the two-sided tile, and wherein each of the sides of the two-sided tile are arranged for use during play, wherein one side provides a first configuration flexibility and, responsive to turning the two-sided tile upside down, the other side provides a second configuration flexibility different from the first configuration flexibility.

11. The interactive gaming system according to claim 1, wherein the tile communicator and the control unit communicator are arranged for communicating wirelessly over a distance of 1-50 meter.

12. The interactive gaming system according to claim 1, wherein the tile communicator and the control unit communicator are arranged for communicating wirelessly over a distance of 1-10 meter.

* * * * *